United States Patent [19]

Noda

[11] 4,179,084
[45] Dec. 18, 1979

[54] FISHING REEL

[75] Inventor: Hideo Noda, Sakai, Japan

[73] Assignee: Shimano Industrial Company Limited, Osaka, Japan

[21] Appl. No.: 902,698

[22] Filed: May 4, 1978

[30] Foreign Application Priority Data

May 9, 1977 [JP] Japan .................................. 52-53317

[51] Int. Cl.² ...................... A01K 89/00; A01K 89/02
[52] U.S. Cl. ...................................... 242/212; 242/220
[58] Field of Search ............... 242/211, 212, 213, 214, 242/218, 219, 220, 221

[56] References Cited

U.S. PATENT DOCUMENTS

| | | | |
|---|---|---|---|
| 1,940,593 | 12/1933 | Henze | 242/221 |
| 2,690,310 | 9/1954 | Hayes | 242/221 |
| 3,489,366 | 1/1970 | Rankin, Jr. | 242/220 |
| 3,971,529 | 7/1976 | Dörbandt | 242/211 |
| 4,014,422 | 3/1977 | Morishita | 242/212 |

Primary Examiner—Billy S. Taylor
Attorney, Agent, or Firm—Stevens, Davis, Miller & Mosher

[57] ABSTRACT

A fishing reel is provided between a spool shaft and a handle shaft with a clutch for transmitting the driving force from the handle shaft to the spool shaft. A clutch lever moves forward to disengage the clutch from the spool shaft so that the spool shaft is freely rotatable and a return plate rotates to return the clutch lever to reengage the clutch with the spool shaft. The clutch lever moves forward in parallel to a first side plate and swings at the end of its forward movement so as to engage with projections at the return plate.

5 Claims, 9 Drawing Figures

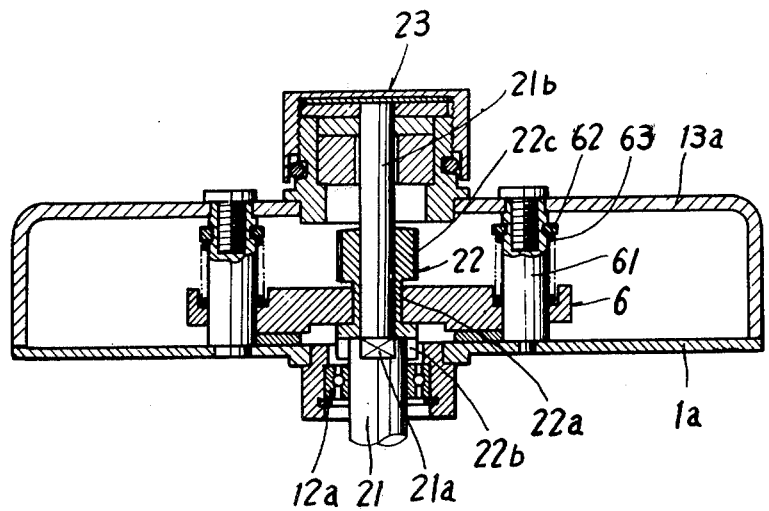
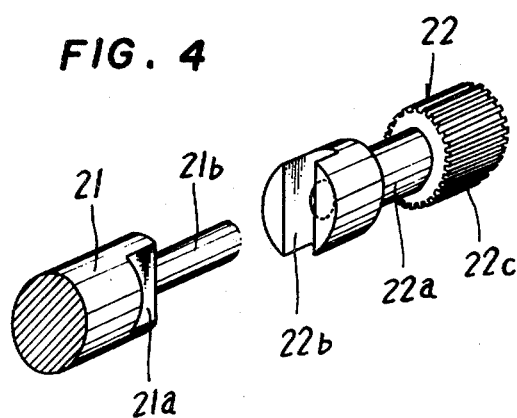

FISHING REEL

This invention relates to a fishing reel for winding up a fishing line onto a spool by turning a crank handle, and more particularly to a fishing reel providing a gear-transmission with a clutch between a spool shaft and a handle shaft driven by the handle, the clutch being movably and rotatably mounted to the spool shaft, so that a clutch operating mechanism causes the clutch to be disengaged from the spool shaft to make it freely rotatable, and a return plate rotated, by the handle shaft, causes the clutch to be engaged with the spool shaft to be rotatable.

Generally, this kind of fishing reel provides a clutch change-over mechanism for disengaging the clutch from the spool and a return plate rotated by the spool shaft for engaging the clutch therewith. The clutch operating mechanism is composed mainly of a clutch lever and a clutch holder movable together with the clutch. The clutch lever is moved forward to disengage the clutch from the spool shaft and returned by the rotating return plate through projections thereof engaged with the clutch lever, thereby engaging the clutch with the spool shaft.

A conventional clutch operating mechanism, however, has the disadvantage that the projections at the return plate may be aligned along a line of movement of the clutch lever depending on the position where the handle is stopped, whereby the projections occasionally hinder the clutch lever from moving forward for disengagement of the clutch, thus causing a dull action thereof. This is especially true where a large number of projections are provided to quicken the clutch lever return by a slight turn of the handle the dull action occurs more frequently.

Hence, to avoid the abovementioned hindrance of the clutch lever, the handle should be turned to some extent and the projection be displaced and thereafter the clutch lever be reoperated, whereby clutch operation becomes very troublesome and the clutch lever is forcibly operated to cause damage in the clutch or return plate.

The present invention has been designed to overcome the foregoing problems. An object of the invention is to provide a fishing reel always capable of disengaging the clutch from the spool shaft reliably and smoothly without trouble such as caused by displacement of the projections even when there are positioned on the line of movement of the clutch lever, avoiding damage of the clutch or return plate caused by forcibly operating the clutch lever, and returning the lever very quickly and accurately even with a slight rotation of the handle.

This invention is characterized in that the clutch lever is moved forward in parallel with respect to the return plate and is swung axially thereof in the vicinity of the projections.

In greater detail, the clutch lever is composed of control arms and a guide in parallel to the first side plate, each of the control arms extending upward and being bent to form a slant surface, so that the guide is shifted outwardly with respect to the first side plate through the slant surface. The clutch lever is urged toward the first side plate by a spring provided at a clutch holder movable together with the clutch axially of the spool shaft, whereby the clutch lever is, when moving forward, moved in parallel to the first side plate by means of the spring and is, at the end of the forward movement, swung around the bent portion of the slant surface to shift the utmost end of each of the control arms of the clutch lever axially of the return plate, thereby being engaged with projections thereat.

Hence, even when the projections happen to be positioned on the line of forward movement of a control arm, the utmost ends of control arms are not hit by the projections due to a certain clearance from the tips thereof, and after a finish of movment the control arms are shifted toward the projection to be in contact therewith.

These objects and others and novel features of the invention will be more apparent from the following description of the embodiment in the accompanying drawings, in which:

FIG. 3 is a sectional view taken on line III—III in FIG. 2, FIG. 4 is a perspective view showing the clutch and spool shaft.

Figure 1:
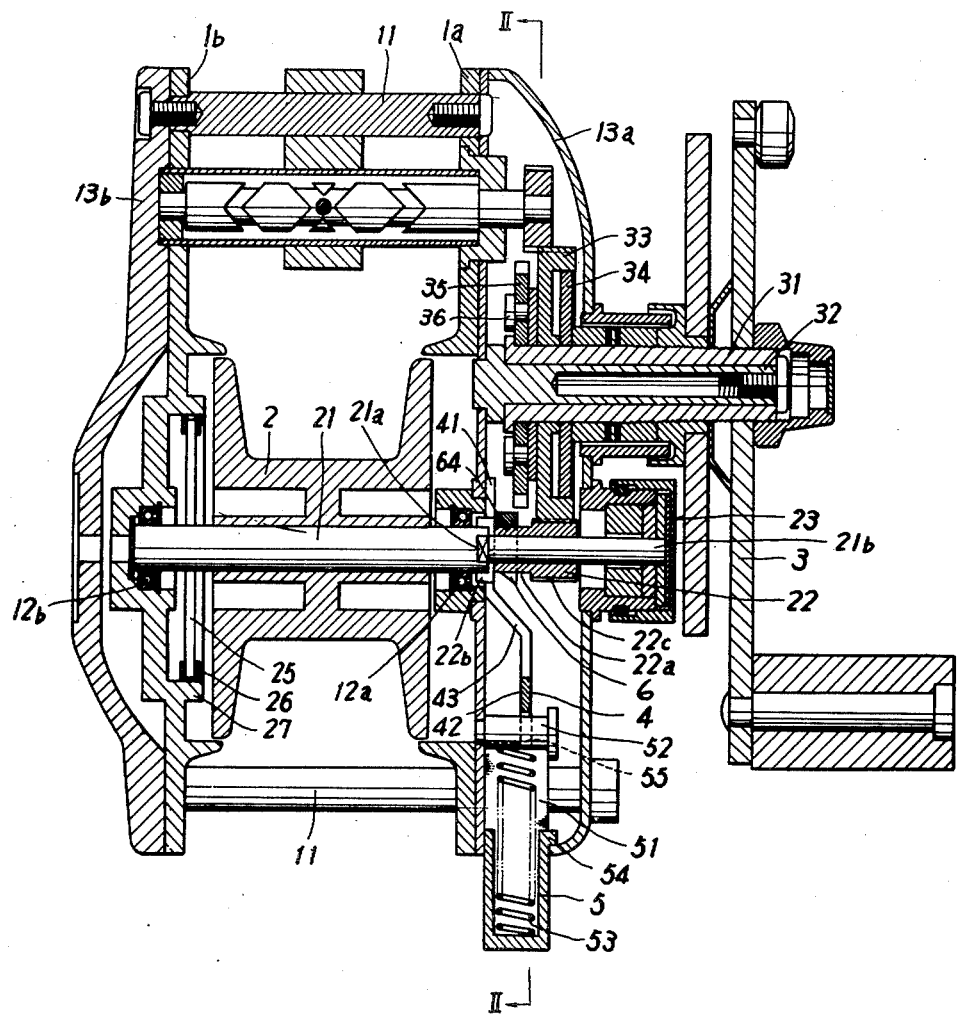
FIG. 1 is a longitudinally sectional view of the embodiment of the fishing reel of the invention.

Referring to the drawings, the reference numerals 1a and 1b designate a first and second side plates opposite to each other and spaced a given amount. Both the side plates 1a and 1b are connected with a plurality of connecting rods 11, and provided with opposite ball bearings 12a and 12b and covers 13a and 13b fixed to the outer sides of the same respectively.

A spool 2 for winding up a fishing line is fixed to a spool shaft 21 which is journalled between both the side plates 1a and 1b through the bearings 12a and 12b, thereby being rotatably carried therebetween. The spool shaft 21 projects at its one end outwardly from the first side plate 1a to form a projection 21b and is, as shown in FIG. 4, provided at a substantially intermediate portion in the vicinity of the side plate with opposite flat faces 21a in engagement with a clutch 22 to be hereinafter described. The projection 21b is made smaller in diameter than the shaft 21 and projects at its utmost end further outwardly from the cover 13a where it is provided with a drag mechanism 23.

The clutch 22 constitutes a gear-transmission for the driving force from a handle shaft 31 to the spool shaft 21 together with a drive gear 33 to be hereinafter described. The clutch 22 is, as shown in FIG. 4, made cylindrical so as to be axially movable and rotatably sleeved onto the projection 21b. Clutch 22 has an annular groove 22a at a substantially axially intermediate portion and at one axial end a portion 22b in engagement with the flat faces 21a at the spool shaft 21 and at the other axial end a gear 22c always in mesh with the drive gear 33 which is hereinafter described.

When the engaging portion 22b at the clutch 22 is engaged with the flat faces 21a, the driving force is transmitted from the drive gear 33 to the spool shaft 21 through the clutch 22, thus rotating the spool 2. Clutch 22 is also axially movable for disengagement from the spool shaft 21, thereby causing a free rotation of the spool shaft 21.

In addition, a radially extending brake lever 25 is provided at the spool shaft 21 in the vicinity of the second side plate 1b. Tubular brake shoes 26 are inserted freely onto the brake lever 25, and a cylindrical brake drum 27 is formed at the second side plate 1b around the spool shaft 21, whereby when the spool shaft 21 rotates the brake shoes 26 are pressed onto the inner periphery of the drum 27 by means of centrifugal force so as to apply resistance against the rotation of the spool shaft 21.

A crank handle 3 serves to rotate the spool 2. A handle shaft 31 is rotatably inserted onto a support rod 32, the later being fixed to the first side plate 1a, and the handle shaft 31 is protrudent outwardly of the cover 13a, and fixed to the handle 3. Onto the handle shaft 31 are inserted the drive gear 33 which always meshes with the clutch 22, a friction plate 34 abutting against the drive gear 33, and a return plate 35 having a plurality of projections 36. The friction plate 34 and return plate 35 are inserted onto the handle shaft 31 so as to be non-rotatable with respect thereto but rotatable together therewith, and the drive gear 33 is freely inserted onto the handle shaft 31 in relation of being rotatable only through the friction plate 34, whereby the spool 2 is rotatable by a desirable driving force adjusted by the extent of abutment of the friction plate 34 against the drive gear 33. In other words, the spool 2 is, when subjected to great resistance against its rotation, stopped or reversely rotated regardless of turning the handle 3. The thus described fishing reel construction is well-known and clearly understood requiring no further detailed description.

Next, the operating mechanism for the clutch 22 described as above will be detailed in the following description.

The operating mechanism comprises a clutch lever 4, a control member 5 for controlling the clutch lever 4, and a clutch holder 6 movable together with the clutch 22 axially of the spool shaft 21. The clutch lever 4 serves to axially move the clutch 22 through the clutch holder 6 engaged with the same, thereby disengaging the engaging portion 22b of the clutch 22 from the flat engaging faces 21a. The clutch lever 4, at the spool shaft 21, is formed of a plate member, and has two control arms 41 and a guide 42 as shown in FIG. 2.

The guide 42 is counter-L-like shaped and has a guide slot 44 at an extension in the direction of movement of the clutch lever 4, into which guide slot is inserted a guide pin 45 protrudent at the outer surface of the first side plate 1a to thereby reciprocally guide the clutch lever 4. Each of the control arms 41 projects from the guide 42 in the moving direction thereof and is bent at a substantially intermediate portion to form a slant surface 43, so that the end of the control arm 41 and the guide 42 may be displaced oppositely through the bent and stepped portion. The control arms 41 and guide 42 are arranged in parallel to the first side plate 1a so that the control arms 41 are, as shown in FIG. 1, in contact with the outer surface of the first side plate 1a while the guide 42 is outwardly spaced from the first side plate 1a.

Figure 2:
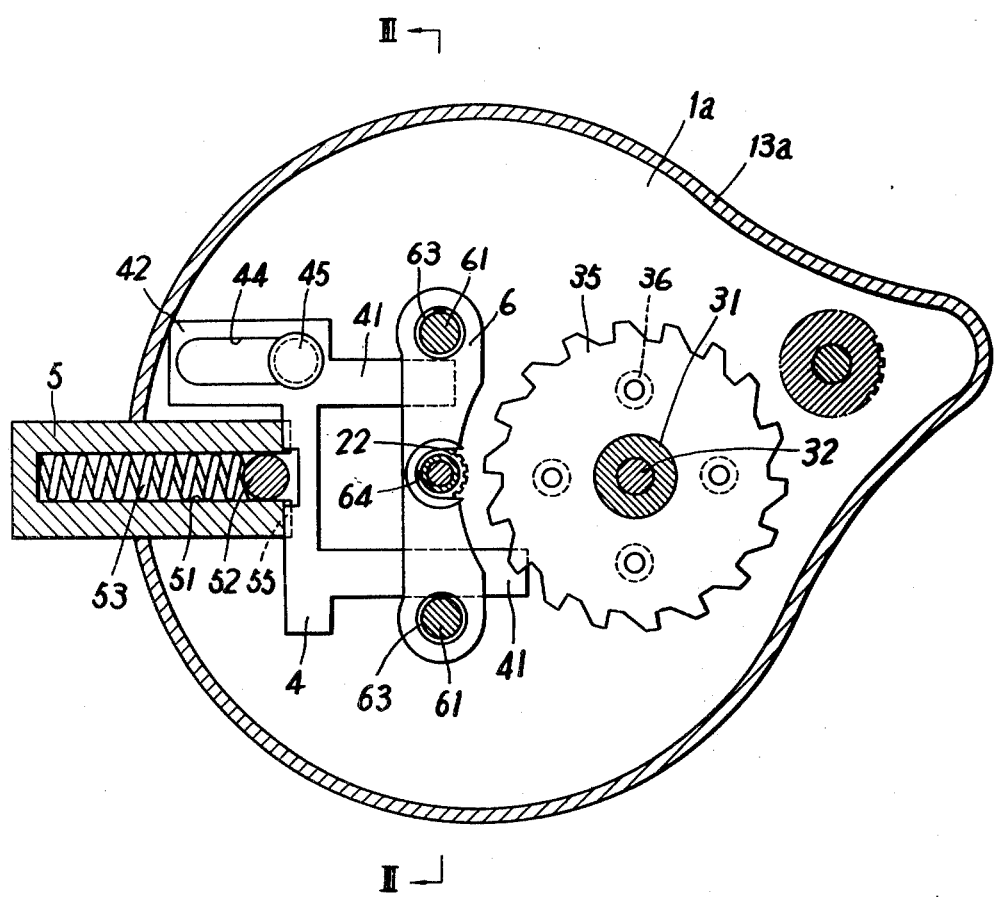
FIG. 2 is a sectional view taken on Line II—II in FIG. 1.

The control member 5 is, as shown in FIGS. 1 and 2, formed in a cylindrical shape with a bottom and has at the opening end a split groove 51 into which the guide pin 52 projects from the outer surface of the first side plate 1a, whereby the control member 5 is reciprocally movable through the pin 52. Between the control member 5 and the guide pin 52 is inserted a spring 53 for constantly urging the control member 5 to project at its closed end outwardly of the cover 13a. At a substantially intermediate portion of the control member 5 is provided a projection 54 extending outwardly which abuts against the cover 13a to thereby restrict the control member 5 from coming out of the cover 13a. At the inner end of the control member 5, i.e. the end face opposite to the clutch lever 4 is formed a notched portion 55 which receives therein the guide 42 at a substantially intermediate portion thereof.

The clutch holder 6 is formed of a thick plate having a length larger than an interval between both control arms 41 which is fixed at the outside of the control arms 41 through two pins 61 secured between the first side plate 1a and the cover 13a in relation of being movable in parallel to the axial direction of the spool shaft 21. Two rings 62 are attached to the pins 61 at a side of the cover 13a and springs 63 are inserted between the rings 62 and the clutch holder 6 respectively, so that the clutch holder 6 is always urged toward the first side plate 1a through the springs 63. The clutch holder 6 also has a cut out 64 of substantially semicircular shape at one widthwise side of a substantially lengthwise intermediate portion thereof. Cutout 64 is insertably engaged with the clutch 22 through its annular groove 22a, whereby the clutch holder 6 is movable to shift the clutch 22 axially of the spool shaft 21 through the engagement. Clutch holder 6 has, at the other widthwise side, a surface 65 slantwise identically with the slant face 43 of the clutch lever 4. The clutch lever 4 abuts against the first side plate 1a through the clutch holder 6 in contact with the same and urged by the springs 63.

Next, the function of the fishing reel of the invention constructed as described, will be detailed as follows:

The clutch 22 is pushed by both the springs 63 the clutch 22 connected with the spool shaft 21 through the engagement of the engaging portion 22b with the flat engaging portions 21a of the spool shaft 21, whereby the rotation of the handle 3 is transmitted from the handle shaft 31 to the spool shaft 21 through the friction plate 34, drive gear 33 and clutch 22, thus rotating the spool 2 to wind up thereon the fishing line.

When the line is to be drawn out from the spool 2 for casting, the control member 5 is pushed and moved forward against the spring 53, the clutch lever 4 is moved forward through the notched portion 55, and the clutch holder 6 is moved axially outwardly of the spool shaft 21 against the springs 63, whereby the clutch 22 is disconnected from the spool shaft 21, thus causing free rotation of the spool shaft 21.

In this instance, the clutch lever 4, which is urged toward the first side plate 1a through the clutch holder 6 and held by the control member 5 through the notched portion 55 thereof, moves forward along the side plate 1a in parallel to the return plate 35, thereby allowing the tips of the control arms 41 to enter between the first side plate 1a and the return plate 35. Under these conditions, the control member 5, when released from the push control, moves downward by the action of spring 53 returning to its original position, whereby the clutch lever 4 is disengaged from the notched portion 55. Since the clutch holder 6 urged toward the side plate 1a by the springs 63 pushes the lower corner of the slant face 43 of each of the control arms 41, so that the end of the guide 42 is pushed to abut against the side plate 1a, at this time, the utmost ends of the control arms 41 are shifted in a swinging motion by means of leverage to thereby abut against the return plate 35. As a result, when the handle shaft 31 is rotated by the handle 3 for winding up the line, the return plate 35 rotating with the handle shaft 31 hits the utmost ends of the clutch lever 4 with its projections 36, whereby the clutch lever 4 is restored and the clutch 22 moves axially of the spool shaft 21 toward the side plate 1a through the springs 63, thus engaging with the spool shaft 21 again.

Figure 5:
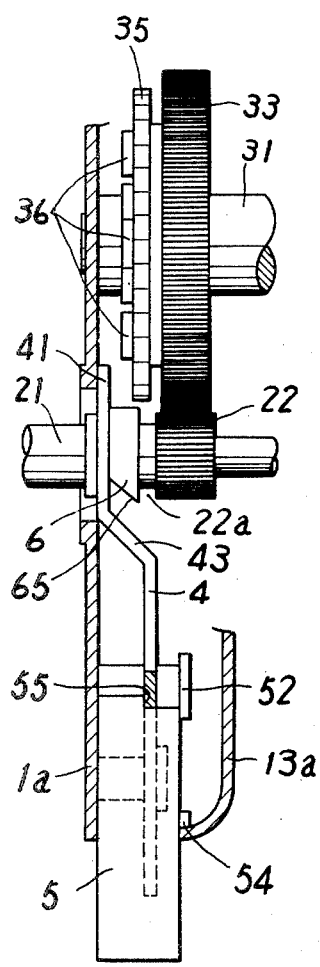
FIGS. 5 through 7 are diagrams showing function of the clutch lever.
Figure 6:
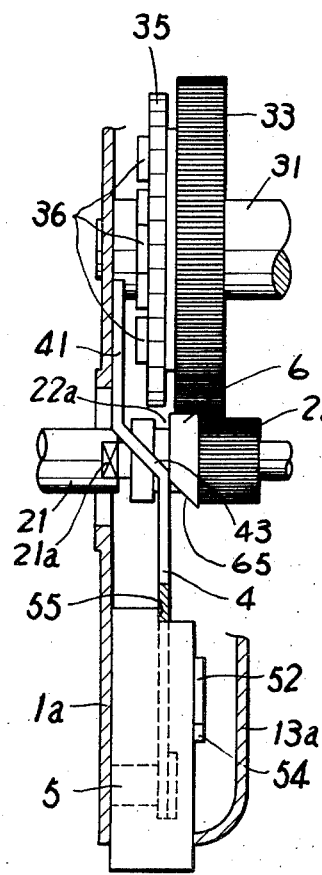
Figure 7:
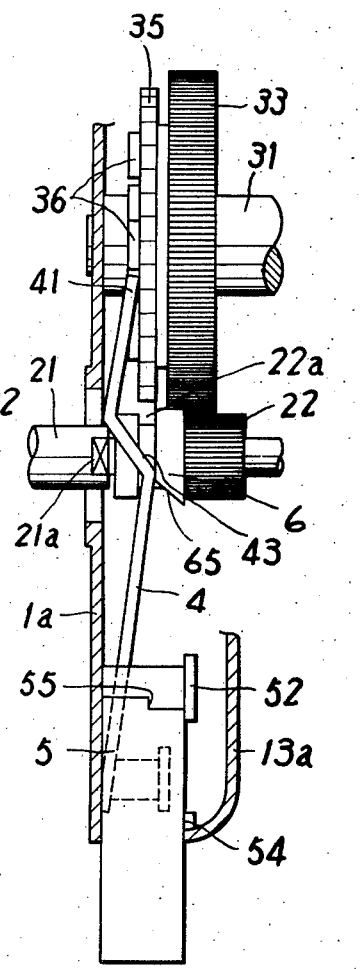
Figure 8:
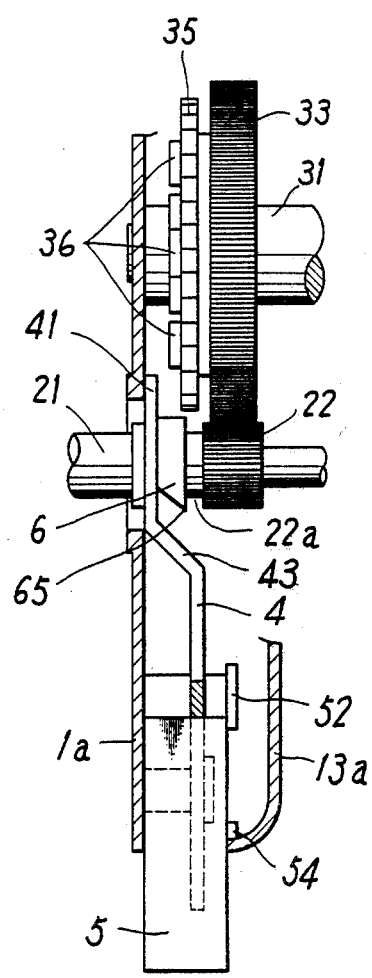
FIGS. 8 and 9 are partially cutaway side views of FIG. 5 showing modified embodiments of the invention.
Figure 9:
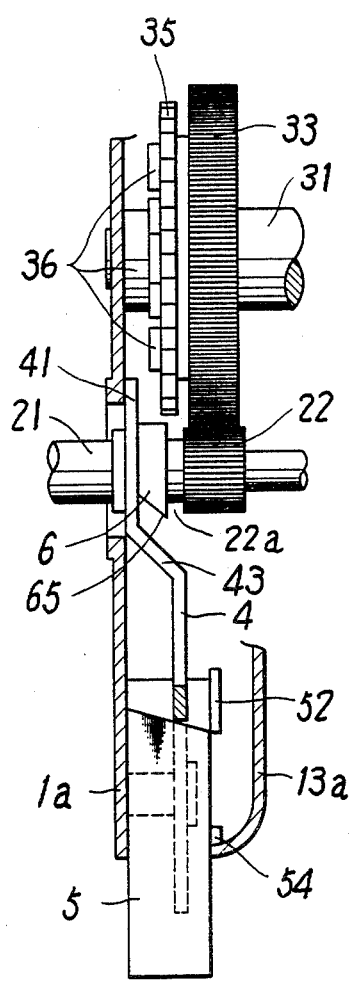

In addition, the restored clutch lever 4 is refit into the notched portion 55 by being pressed onto the side plate 1a through the clutch holder 6 as shown in FIG. 5. However, the notched portion is not particularly necessary, that is, the clutch lever 4 may merely be abutted against the inner surface of control member 5 with which the lever 4 is supported, the holding face of the control member 5 may, as shown in FIG. 8, be normal to the first side plate 1a, or may, as shown in FIG. 9, be tapered so that the side edge of the first side plate 1a is displaced toward the clutch 22.

At the described embodiment, a compression spring 53 was between the control member 5 and the guide pin 52 is inserted the compression spring, but a tension spring may be provided to always draw into the control member, which makes it possible to check the disengagement of the clutch 22 from the spool shaft 21 through the position of pushed control member 5.

As clearly understood from th aforesaid description, the fishing reel of the invention is constructed such that the clutch lever 4 is, when operated in reciprocation to disengage the clutch from the spool shaft, shifted in parallel to the return plate and then swung axially thereof, hence, no projection at the return plate hinders the clutch lever from its forward movement even when positioned on the line of the movement thereof. Accordingly, the clutch can be disengaged reliably and smoothly, and also there is no fear that the clutch lever is forcibly moved to cause damage of the clutch or return plate, so that the projections may be increased, thereby enabling the clutch lever to return quickly and properly by slightly turning the crank handle.

While, an embodiment of the invention has been shown and described, the invention is not limited to the specific construction thereof, which is merely exemplified in the specification rather than defined.

What is claimed is:
1. A fishing reel comprising;
first and second spaced apart side plates arranged in parallel with one another;
a spool shaft rotatably journalled between said first and second side plates;
a spool mounted to said spool shaft for rotation therewith;
a handle shaft supported to said first side plate;
a mechanism for transmitting the driving force from said handle shaft to said spool shaft comprising a driving gear and a clutch in mesh therewith, said clutch being axially movable and rotatable with respect to said spool shaft; and
a clutch control mechanism for controlling said clutch, said clutch control mechanism comprising, means for reciprocally mounting a clutch lever to said first side plate, a control member for controlling movement of said clutch lever and having a holding face, a clutch holder connected to said clutch for moving said clutch axially of said spool shaft to thereby disconnect said clutch from said spool shaft, and a return plate rotating together with said handle shaft and having projections thereon for restoring said clutch lever to its original position, said clutch holder being biased by means of springs to urge said clutch into engagement with said spool shaft and said clutch lever against an outside surface of said first side plate, said clutch lever comprising control arms and a guide in parallel with said first side plate, each of said control arms having a slant face formed at a bent portion thereof, said slant face causing said guide to be displaced from said first side plate, said clutch lever being received by said holding face of said control member such that operation of said control member causes initial movement of said clutch lever in a direction which is parallel to said first side plate and subsequent swinging movement of said clutch lever axially of said return plate, thereby shifting said clutch lever to a position where the utmost ends of said control arms engage with projections of the return plate.

2. The fishing reel according to claim 1, wherein said holding face of the control member is provided with a notched portion.

3. The fishing reel according to claim 1, wherein said holding face of the control member is flat and normal to said first side plate.

4. The fishing reel according to claim 1, wherein said holding face of the control member is formed in a tapered face whose edge at a side of said first side plate is displaced toward said clutch.

5. The fishing reel according to claim 1, wherein said clutch holder is provided at a side thereof facing said control member with a surface slantwise identical to said slant faces of said control arms.

* * * * *